(12) United States Patent
Chhabra et al.

(10) Patent No.: US 10,691,813 B2
(45) Date of Patent: Jun. 23, 2020

(54) TECHNIQUES FOR ENCLAVE CONFIDENTIALITY MANAGEMENT

(71) Applicant: INTEL CORPORATION, Santa Clara, CA (US)

(72) Inventors: Siddhartha Chhabra, Portland, OR (US); David M. Durham, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 259 days.

(21) Appl. No.: 15/942,122

(22) Filed: Mar. 30, 2018

(65) Prior Publication Data

US 2019/0050581 A1 Feb. 14, 2019

(51) Int. Cl.
| | |
|---|---|
| G06F 21/60 | (2013.01) |
| H04L 9/08 | (2006.01) |
| H04L 9/06 | (2006.01) |
| G06F 21/79 | (2013.01) |
| G06F 12/1009 | (2016.01) |
| G06F 12/14 | (2006.01) |
| G06F 12/1027 | (2016.01) |

(52) U.S. Cl.
CPC ............ *G06F 21/602* (2013.01); *G06F 21/79* (2013.01); *H04L 9/0662* (2013.01); *H04L 9/0847* (2013.01); *H04L 9/0897* (2013.01); *G06F 12/1009* (2013.01); *G06F 12/1027* (2013.01); *G06F 12/1475* (2013.01); *G06F 2212/1052* (2013.01); *G06F 2212/657* (2013.01); *G06F 2221/2107* (2013.01); *G06F 2221/2149* (2013.01)

(58) Field of Classification Search
None
See application file for complete search history.

(56) References Cited

U.S. PATENT DOCUMENTS

| | | | |
|---|---|---|---|
| 2008/0229117 A1* | 9/2008 | Shin ...................... | G06F 21/123 713/190 |
| 2013/0159726 A1* | 6/2013 | McKeen ................. | G06F 21/72 713/189 |
| 2013/0238907 A1* | 9/2013 | Debout ............... | G06F 12/1408 713/193 |
| 2017/0039368 A1* | 2/2017 | Grobman ............... | H04W 12/06 |
| 2017/0286326 A1* | 10/2017 | Guim ................... | G06F 12/1009 |
| 2018/0046823 A1* | 2/2018 | Durham .................. | G06F 21/53 |
| 2018/0330079 A1* | 11/2018 | Gray ..................... | G06F 21/602 |

* cited by examiner

*Primary Examiner* — Benjamin E Lanier

(57) ABSTRACT

Various embodiments are generally directed to techniques for enclave confidentiality management, such as for protecting cross enclave confidentiality on servers, for instance. Some embodiments are particularly directed to a computing platform including hardware and/or instruction set architecture (ISA) extensions that ensure enclaves cannot access confidential data of other enclaves. For example, key programming ISA extensions and/or hardware changes to the page miss handler (PMH) may ensure that the key uniquely associated with an enclave is used for its memory accesses.

25 Claims, 10 Drawing Sheets

602
Determine whether a memory access request targets data associated with an enclave, the memory access request associated with a set of physical address bits comprising a set of key identifier bits and a set of memory address bits

604
Identify an enclave key identifier based on the enclave associated with the access request when the memory access request targets data associated with the enclave

606
Replace the set of key identifier bits with the enclave key identifier to produce a revised set of physical address bits when the memory access request targets data associated with the enclave

*FIG. 7*

Storage Medium 700

*Computer Executable Instructions for 400*

*Computer Executable Instructions for 500*

*Computer Executable Instructions for 600*

TECHNIQUES FOR ENCLAVE CONFIDENTIALITY MANAGEMENT

BACKGROUND

Cryptography may refer to the practice and study of techniques for secure communication in the presence of third parties. More generally, cryptography is about constructing and analyzing protocols that prevent third parties from reading confidential data. In the context of cryptography, confidentiality may relate to ensuring that data is not made available or disclosed to unauthorized people. In application, cryptography can involve one or more of encryption and decryption. Encryption can be the process of converting ordinary information, referred to as plaintext, into an unintelligible sequence of symbols, referred to as ciphertext, and decryption can be the process of converting ciphertext back to plaintext. Typically, a cipher system may include a pair of algorithms that convert data back and forth between plaintext and ciphertext. In various embodiments, cipher systems may use keys to convert between plaintext and ciphertext.

BRIEF DESCRIPTION OF THE DRAWINGS

FIG. 6 illustrates an embodiment of a third logic flow.

FIG. 7 illustrates an embodiment of a storage medium.

DETAILED DESCRIPTION

Figure 1:
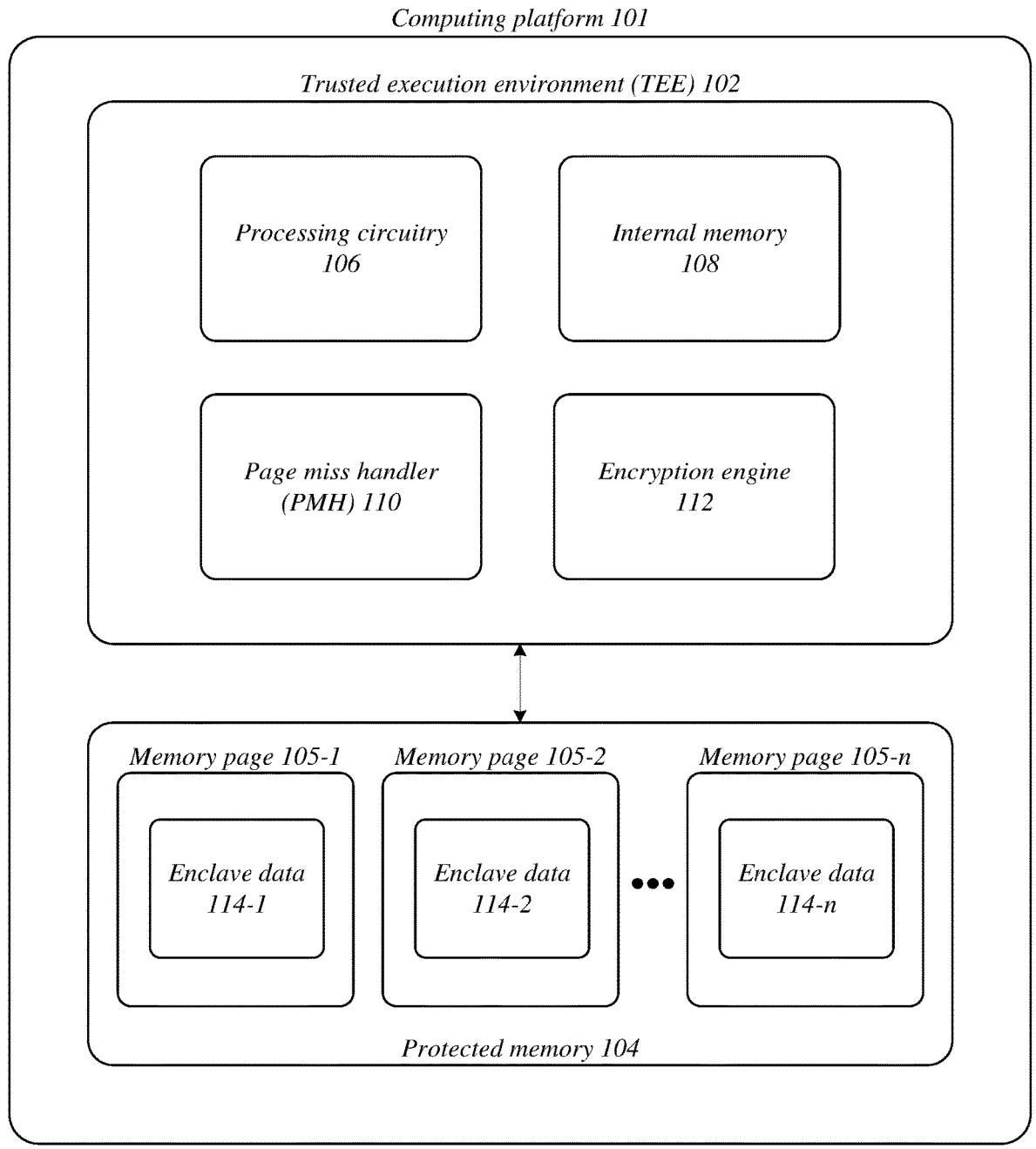
FIG. 1 illustrates an embodiment of a first operating environment.

Various embodiments are generally directed to techniques for enclave confidentiality management, such as for protecting cross enclave confidentiality on servers, for instance. Some embodiments are particularly directed to a computing platform including hardware and/or instruction set architecture (ISA) extensions that ensure enclaves cannot access confidential data of other enclaves. In one embodiments, for example, an apparatus for enclave confidentiality management may comprise logic, at least a portion of the logic implemented in circuitry. In various embodiments, the logic may determine whether a memory access request targets data associated with an enclave. In several embodiments, the memory access request may be associated with a set of physical address bits that include a set of key identifier bits and a set of memory address bits. In some embodiments, the logic may identify an enclave key identifier based on the enclave associated with the memory access request when the memory access request targets data associated with the enclave. In many embodiments, the logic may replace the set of key identifier bits with the enclave identifier to produce a revised set of physical address bits when the memory access request targets data associated with the enclave. These and other embodiments are described and claimed.

Some challenges facing computing platforms include the inability to ensure cross-enclave confidentiality. These challenges may result from using a single cryptographic key for all enclaves implemented on a computing platform. When a common key is used for all enclave memory an adversary with physical access to the computing platform may construct attacks to leak enclave secrets. For instance, the adversary may insert an interposer to record memory contents for a first enclave. In such instances, once the first enclave is de-scheduled (or done processing), a second enclave (potentially malicious) may be assigned the same physical pages that the first enclave was operating on, and the adversary may use the interposer to inject the data recorded from the first enclave directly to the memory. Once the data recorded from the first enclave is injected, the second enclave may decrypt and read the data because both enclaves use a common key. These and other factors may result in computing platforms with deficient performance and insufficient ability to provide cross-enclave confidentiality. Such limitations can drastically reduce the capabilities, usability, and applicability of the computing platform, contributing to inefficient systems with limited capabilities.

Various embodiments described herein include a computing platform with hardware and/or instruction set architecture (ISA) extensions that ensure enclaves cannot access confidential data of other enclaves. For example, key programming ISA extensions and/or hardware changes to the page miss handler (PMH) may ensure that the key uniquely associated with an enclave is used for its memory accesses. In one or more embodiments, application-level isolation may be provided, such as in conjunction with an enclave implemented via a trusted execution environment (TEE). For instance, enclave data stored external to the TEE may be encrypted/decrypted using enclave specific keys. In many embodiments, the use of unique keys for each enclave may provide security against confidentiality leaks between enclaves, such as in a set of enclaves implemented by a computing platform (e.g., server). Accordingly, for instance, the second enclave described above would not be able to decrypt data from the first enclave even if the data from the first enclave was injected into memory (e.g., as part of an attack) because the data would be decrypted with the wrong key. In some embodiments, these techniques may be combined with memory integrity. In such embodiments, the injection of data, or other data manipulation, would result in an integrity failure, and thereby provide detection of the attack. In these and other ways the computing platform may enable quick and efficient memory protections between enclaves to achieve improved memory security, resulting in several technical effects and advantages including increased capabilities and improved adaptability.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given. For instance, in some embodiments, a machine may include a virtual machine implemented on a computing platform.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1 illustrates an example of an operating environment 100 that may be representative of various embodiments. Operating environment 100 may include computing platform 101 with trusted execution environment (TEE) 102 and protected memory 104. In the illustrated embodiment, processing circuitry 106, internal memory 108, page miss handler (PMH) 110, and encryption engine 112 are within the Trusted Computing Base (TCB) of the TEE 102 and enclave data 114-1, 114-2, 114-n are stored on protected memory 104 in memory pages 105-1, 105-2, 105-n, respectively. In one or more embodiments, data stored in protected memory 104 may be encrypted. In various embodiments described herein, computing platform 101 may create one or more enclaves to provide applications with access to a secure execution environment, such as one isolated from the operating system. In many embodiments, at creation, unique keys may be associated with each enclave to encrypt/decrypt corresponding enclave data being stored/accessed on protected memory 104. In many such embodiments, this may provide security against confidentiality leaks between enclaves. Embodiments are not limited in this context.

In many embodiments, when an enclave is created, it may be assigned a unique key that is programmed to encryption engine 112. In many such embodiments, the key programming ISA for the encryption engine 112 may be updated to prevent software from programming any of the enclave keys. In some embodiments, to prevent software from violating the security of an enclave by using an incorrect key, key data may be stored in internal memory 108. For instance, key data may be stored in internal memory 108 (see e.g., FIG. 2A and FIG. 2B). In many embodiments, hardware in the page miss handler (PMH) 110 may ensure only the key associated with the enclave upon creation can be used to decrypt data accessed from protected memory 104. For instance, a portion of the physical address associated with a memory page may include a key identifier that signals to encryption engine 112 which key to use. In such instances, PMH 110 may ensure the key identifier bits of the physical address correspond to the appropriate enclave (see e.g., FIG. 3).

In various embodiments, each enclave actively being used (i.e. has processes being executed or pending execution on processing circuitry 106) may be allocated one or more memory pages in protected memory 104 for storing enclave data. For instance, protected memory 104 may include one or more portions of main memory (e.g., random access memory (RAM)). However, when an enclave is not actively being used, the enclave data may be stored elsewhere, such as secondary memory (e.g., disk), and the associated memory page in protected memory 104 may be reassigned to another enclave. In some embodiments, the protected memory 104 may include or refer to an enclave page cache (EPC) for storing enclave data 114.

Accordingly, in several embodiments described herein, by using a unique key with each enclave, data confidentiality between different enclaves can be robustly maintained throughout page reallocations. For example, a malicious user may utilize an interposer to record memory contents from a first enclave. Subsequently, the first enclave may be de-scheduled (or finish processing), and a second enclave that the malicious user controls may be assigned the same memory pages previously used by the first enclave to store the recorded data. However, if the malicious user attempts to inject the data recorded from the first enclave, the second enclave would attempt to decrypt the injected data with the wrong key and get an incomprehensible output.

While embodiments herein use keys and key identifiers in the physical address in the context of selecting keys for memory encryption, keys also may be used for memory integrity. That is, a message authentication code (MAC) (for example, SHA3 KMAC or counter mode Galois message authorization code (GMAC)) may be used in addition or alternatively to memory encryption, where a MAC value corresponds to each cache line stored in memory to verify the integrity of the cache line. In some embodiments, the MACs may be looked up by the memory encryption engine from an in-memory table or they may be stored in memory. In many embodiments, when storing/writing a cache line to memory, the MACs may be calculated over the cache line data (e.g., hash of the data) and a Key Identifier-selected key (and/or tweak and/or the memory address and/or the KeyID itself) and stored with or separately from the data in memory. In various embodiments, when reading/loading a cache line from memory, the associated stored MAC is again loaded and checked against the loaded cache line data using the key (and/or tweak and/or the memory address and/or the KeyID itself). In various such embodiments, this may assure the data was not modified while in memory and/or assure the correct key was used. Note that in some embodiments the processor may change the key used for the MAC for a cache line of memory by directly writing data (a store without a preceding load operation) to the memory location with the new KeyID, a.k.a. a write-for-ownership. The processor may first flush a particular cache line with the previous KeyID (e.g., via a CLFLUSH instruction using the linear address with the old KeyID), followed by a write-for-ownership for the new KeyID (e.g., a non-temporal move instruction (MOVNT) or equivalent) using a linear address specifying the new KeyID.

Figure 2A:
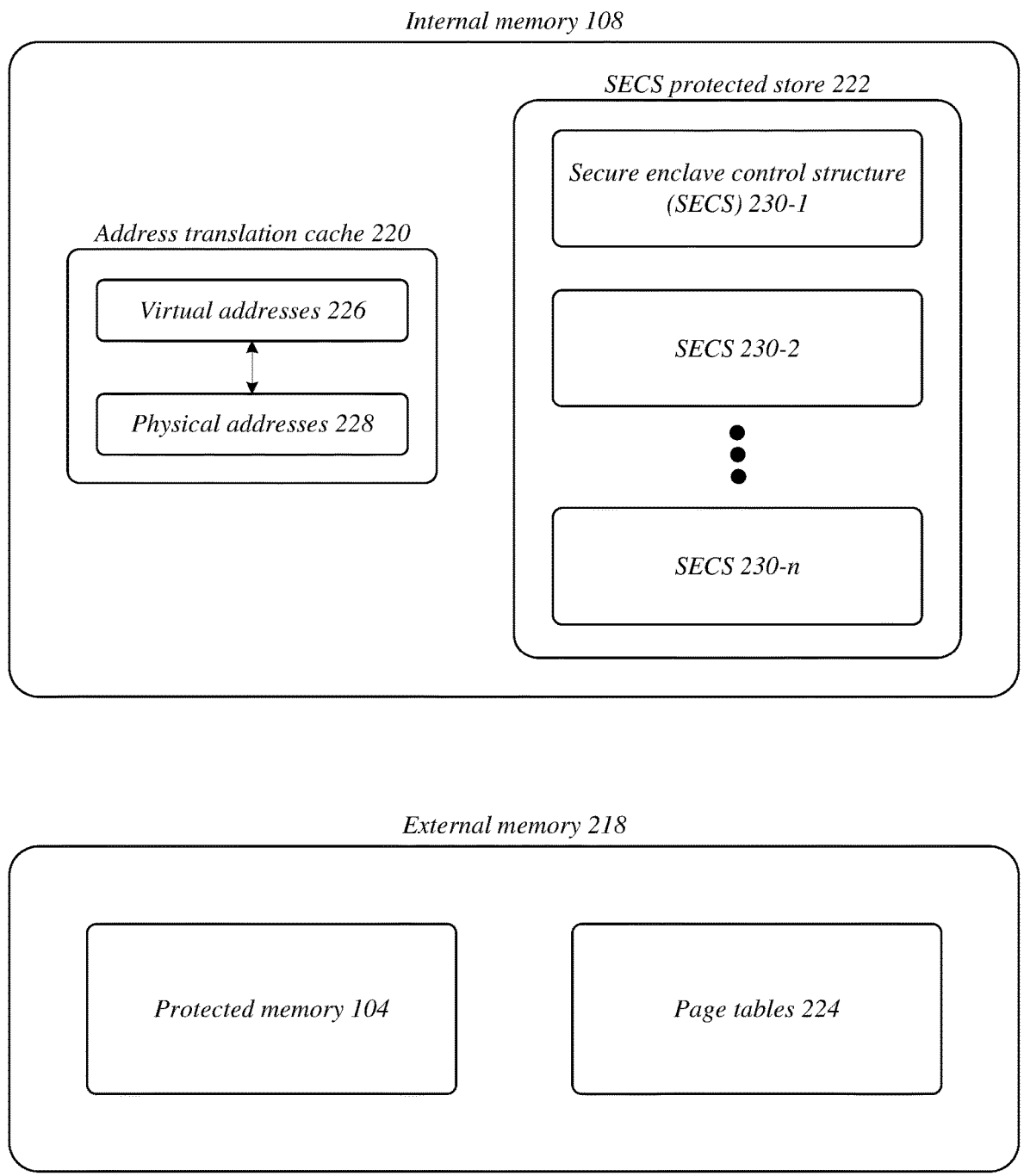
FIG. 2A and FIG. 2B illustrate an embodiment of a second operating environment.
Figure 2B:
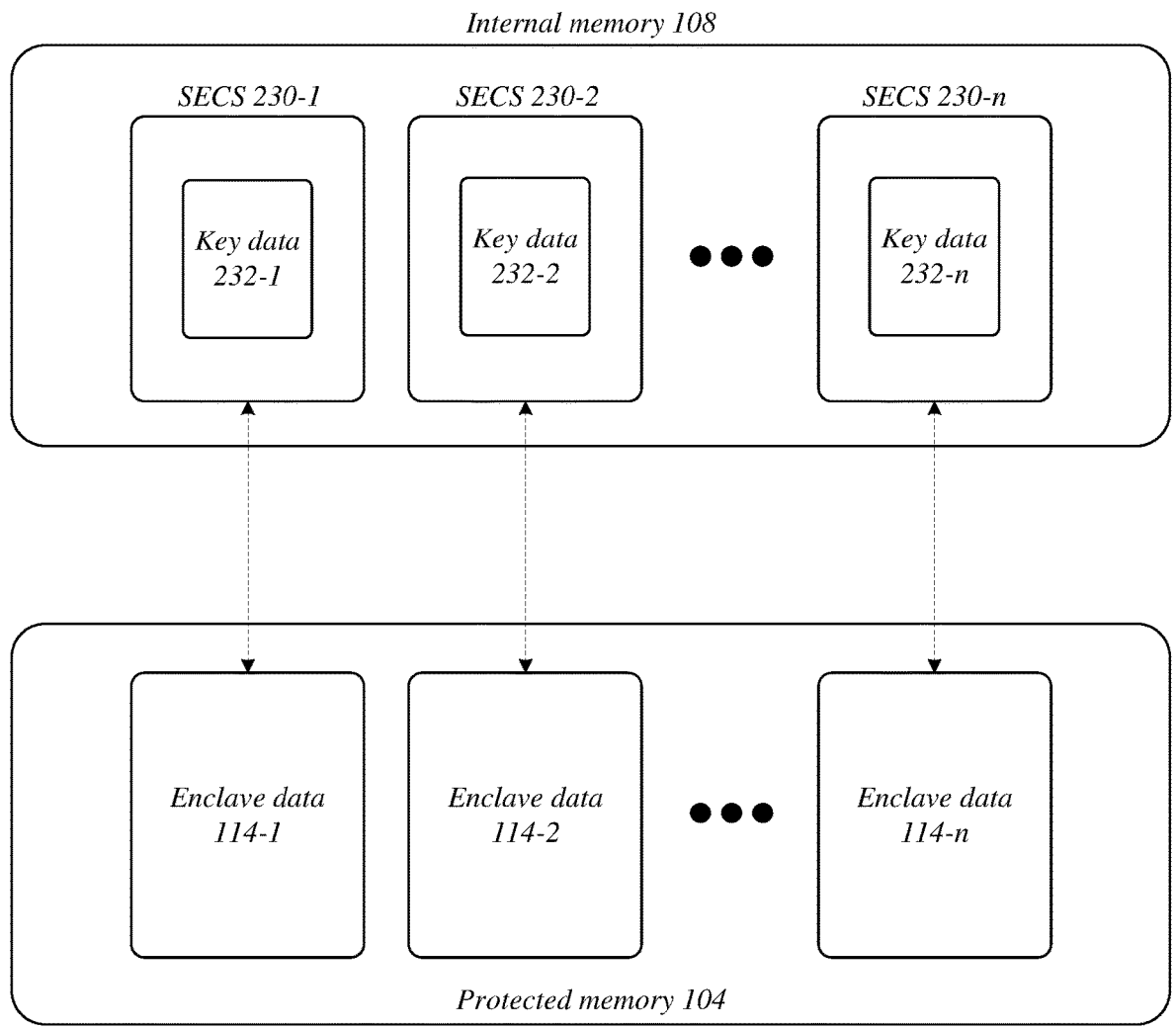

FIG. 2A and FIG. 2B illustrate an example of an operating environment 200 that may be representative of an embodiment of various embodiments. Operating environment 200 may include internal memory 108 and external memory 218. As illustrated in FIG. 2A, internal memory 108 may include address translation cache 220 and SECS protected store 222, while external memory 218 may include protected memory 104 and page tables 224. In various embodiments, internal memory 108 may be within the TCB of the TEE 102. In various embodiments, address translation cache 220 may include translations between virtual addresses 226 and physical addresses 228. In many embodiments, SECS protected store 222 may include one or more secure enclave control structures (SECS) 230-1, 230-2, 230-n. In many such embodiments, each of the SECS 230 may correspond to an enclave. For instance, SECS protected store 222 may include an SECS for each enclave that has been created. As shown in FIG. 2B, each of the SECS 230 may include a key data 232-1, 232-2, 232-n that corresponds to an enclave and thereby a respective enclave data 114. In various embodiments described herein, the key data 232 may enable computing platform 101 to ensure the proper key is used to encrypt/decrypt corresponding enclave data 114. Embodiments are not limited in this context.

In many embodiments, address translation cache 220 may include translations between virtual addresses 226 and physical addresses 228. In many such embodiments, when a translation cannot be located in the address translation cache 220 for a requested memory access, a cache miss may occur. In various embodiments, when an address translation cache miss occurs, the PMH 110 may walk the page tables 224 and populate the address translation cache 220 with the appropriate translation. In some embodiments, the address translation cache 220 may include a translation lookaside buffer (TLB). For example, hardware mechanisms in the PMH 110 may walk the page tables 224 on a TLB miss and populate the TLB with the correct translation.

In one or more embodiments described herein, the PMH 110, in response to an address translation cache miss, may determine if the access is an enclave access. If not, the translation from the page tables 224 (as specified by the software) may be loaded to the address translation cache 220 if the translation specified by the software does not include a key identifier that corresponds to key data 232 in one of SECS 230. However, if the translation specified by the software includes a key identifier that corresponds to key data 232 in one of SECS 230, then the access may be aborted and/or a general protection fault may be signaled back to the software. On the other hand, as will be described in more detail with respect to FIG. 3, for an enclave access, the key identifier portion of the physical address corresponding to the enclave issuing the access request may be read and populated from the key data 232 in the corresponding SECS 230. In many embodiments, this may occur via hardware that is protected from being manipulated by software.

In some embodiments, the SECS 230 may be stored in a region of external memory 218 instead of internal memory 108. For instance, a platform key, separate from application-level or machine-level keys may be used to protect the SECS 230 stored in external memory 218. In many embodiments, the region of external memory 218 with the SECS 230 may have confidentiality, integrity, and a low-cost replay. In such embodiments, message authentication codes associated with the SECS may be stored in internal memory 108.

As shown in FIG. 2B, in some embodiments, SECS 230 may store key data 232. In various embodiments, the key data may correspond to one or more of a key identifier and a key assigned to the enclave that the respective SECS was created for. In many embodiments, the SECS 230 may additionally, or alternatively, include metadata that is used by hardware to protect the enclave from malicious users. For simplicity, a one-to-one correspondence between SECS in internal memory 108 and enclave data in protected memory 104 is shown in FIG. 2B; however, it will be appreciated that each SECS 230 in internal memory 108 may not always correspond to an enclave data in protected memory 104. For instance, when an enclave is not actively being used, the associated SEC may not correspond to data stored in protected memory 104 because protected memory 104 may be allocated to enclaves actively being used.

In various embodiments, in addition to storing SECS 230, internal memory 108 may store enclave data accessed in protected memory 104, such as according to a cache algorithm. In various such embodiments, translations for enclave data stored in internal memory 108 may be stored in address translation cache 220. In many embodiments, when an address translation for enclave data cannot be located in address translation cache 220 it may indicate that the targeted data is located outside of internal memory 108, such as in protected memory 104. In many such embodiments, this may lead to PMH 110 walking page tables 224 for the appropriate translation.

Figure 3:
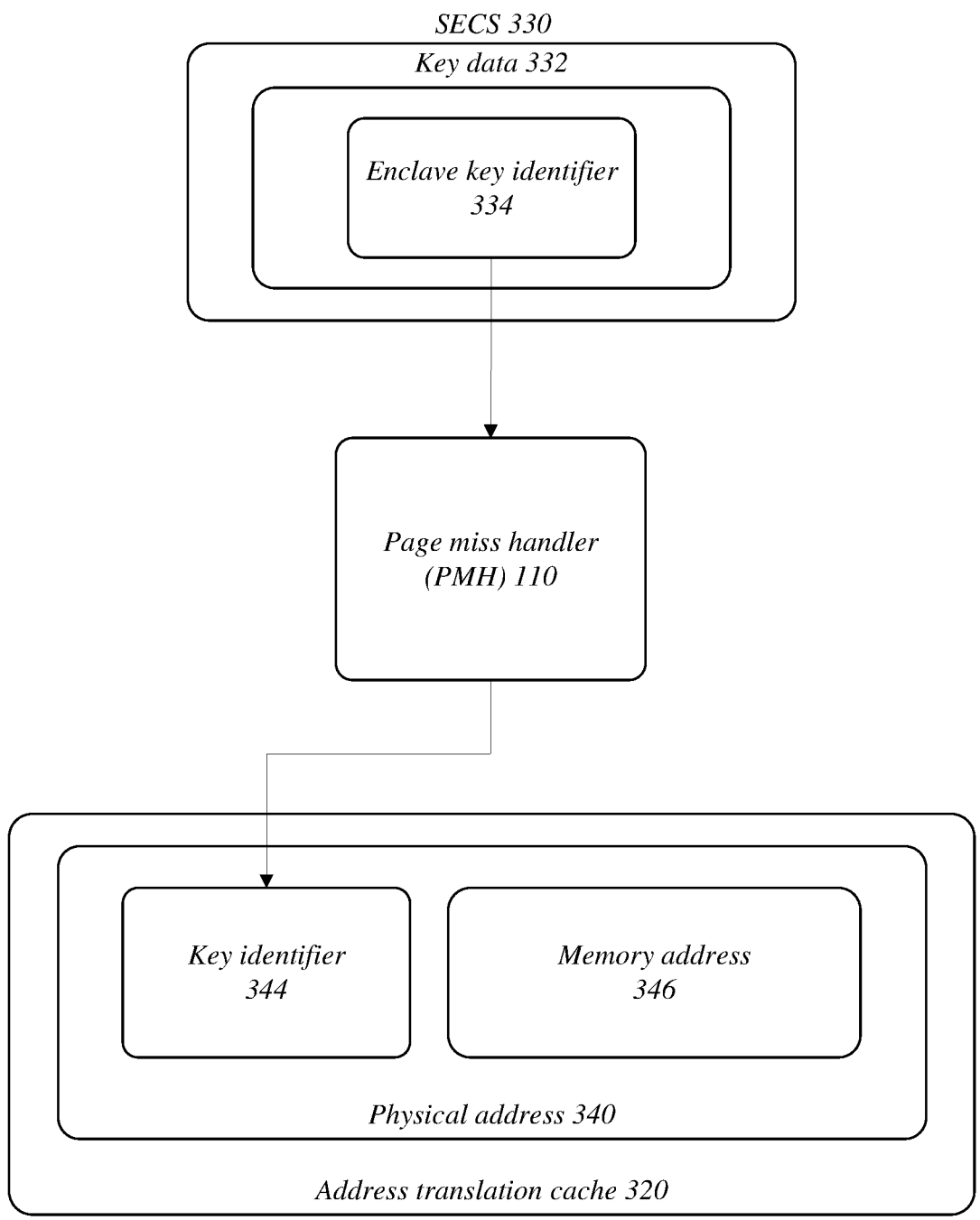
FIG. 3 illustrates an embodiment of a third operating environment.

FIG. 3 illustrates an example of an operating environment 300 that may be representative of various embodiments. Operating environment 300 may include SECS 330, PMH 110, and address translation cache 320. In the illustrated embodiments, SECS 330 may include key data 332 with enclave key identifier 334 and address translation cache 320 may include physical address 340 with key identifier 344 and memory address 346. In some embodiments, the key identifier 344 may refer to a first set of bits in the physical address 340 and the memory address 346 may refer to a second set of bits in the physical address 340. In one or more embodiments, the range of values that may be represented by the key identifier bits may be partitioned between machine-level (M-L) key identifiers and application-level (A-L) key identifiers. In various embodiments described herein, prior to performing an enclave access, PMH 110 may replace the key identifier 344 of physical address 340 with enclave key identifier 334 in address translation cache 320. In various such embodiments, this may ensure that any encrypted data accessed by the enclave corresponding to SECS 330 will be decrypted with the key assigned to the enclave. For example, once replaced with enclave key identifier 334, encryption engine 112 may use the key identifier 344 of the physical address 340 to select which key to use to decrypt data located at the memory address 346. Embodiments are not limited in this context.

In many embodiments, physical address 340 shows an example address layout used herein. As previously mentioned, in various embodiments, the key identifier 344 may include a set of bits that can be used to represent a range of values. For instance, with seven binary bits 128 different values can be represented. In various embodiments described herein, this range of values may be split between A-L key identifiers and M-L key identifiers. For example, if key identifier 344 includes 128 possible values, then the lowest 64 values may be assigned/allocated to M-L key identifiers and the highest 64 values may be assigned/allocated to A-L key identifiers.

In some embodiments, the M-L key identifiers may be used for Intel® Multi-Key Total Memory Encryption usages. In many embodiments, the A-L key identifiers may be used for Intel® Software Guard Extensions usages. In one or more embodiments, the values available to key identifier 344 may be split more than two ways. For instance, the values available to key identifier 344 may be split between A-L keys, M-L keys, and a platform key, such as the platform key described above with respect to storing SECS 230 in external memory 218.

In various embodiments, the M-L key identifiers may be used to maintain machine-level isolation, such as between different virtual machines (VMs). In various such embodiments, the M-L key identifier may be programmed or populated in address translation cache 320 by software, such as a virtual machine monitor (VMM). As previously mentioned, in many embodiments, the A-L key identifier may be used to maintain application-level isolation, such as between different applications being implemented on an operating system running on a virtual machine. In many such embodiments, hardware may replace or overwrite the key identifier 344 with the appropriate enclave key identifier 334 from the SECS 330 that corresponds to the enclave utilized by the application requesting the memory access. In some embodiments, the physical address 340 may be referred to as the revised physical address once the appropriate enclave key identifier has been inserted. In several embodiments, using hardware to replace the A-L key identifier with the appropriate enclave key identifier 334 may prevent software from being able to manipulate the physical address 340 to gain access to secrets of another enclave.

In some embodiments, the Basic Input/Output System (BIOS) may split the keys, or available key identifier values, between machine level and application level uses. In various embodiments, once programmed by the BIOS, the application level keys will not be software programmable. In many embodiments, to achieve this, the key programming ISA, such as PCONFIG, may be enhanced to prevent software manipulation. In one or more embodiments, PCONFIG may check whether an M-L key identifier specified by software is outside of the range of available or potential M-L key identifiers. If it is, PCONFIG may error out and thereby prevent software from programming the A-L keys. For instance, with a 6-bit key identifier, values 0-31 may be assigned/available to M-L key identifiers and values 32-63 may be assigned/available to A-L. In such instances, if the key identifier 344 includes the value between 32 and 63, PCONFIG may error out and prevent programming. Similarly, for application usages, whatever the machine or system software (e.g., operating system or virtual machine monitor) tries to use for the key identifier 344 will be overwritten with the enclave key identifier 334 stored in the SECS 330 to ensure that the proper key identifier is used. In some embodiments, separate control may be provided to the BIOS to select the number of A-L keys and/or M-L keys (e.g., the split in available values). In various embodiments, an authenticated code module may check the BIOS configuration of keys to ensure that the key identifiers (e.g., values) programmed for A-L and M-L uses do not overlap. In various such embodiments, this may occur before an enclave can be launched or activated.

With the above described key partitioning, the key identifier values may be securely split between application-level (i.e., enclave) and machine-level usages. However, as software cannot be in control of enclave key identifier programming, a hardware mechanism is used for assigning key identifier for enclave purposes. In some embodiments, microcode (μcode) may handle assigning enclave key identifiers at enclave creation time. Enclave creation will be described in more detail below, such as with respect to FIG. 4.

Figure 4:
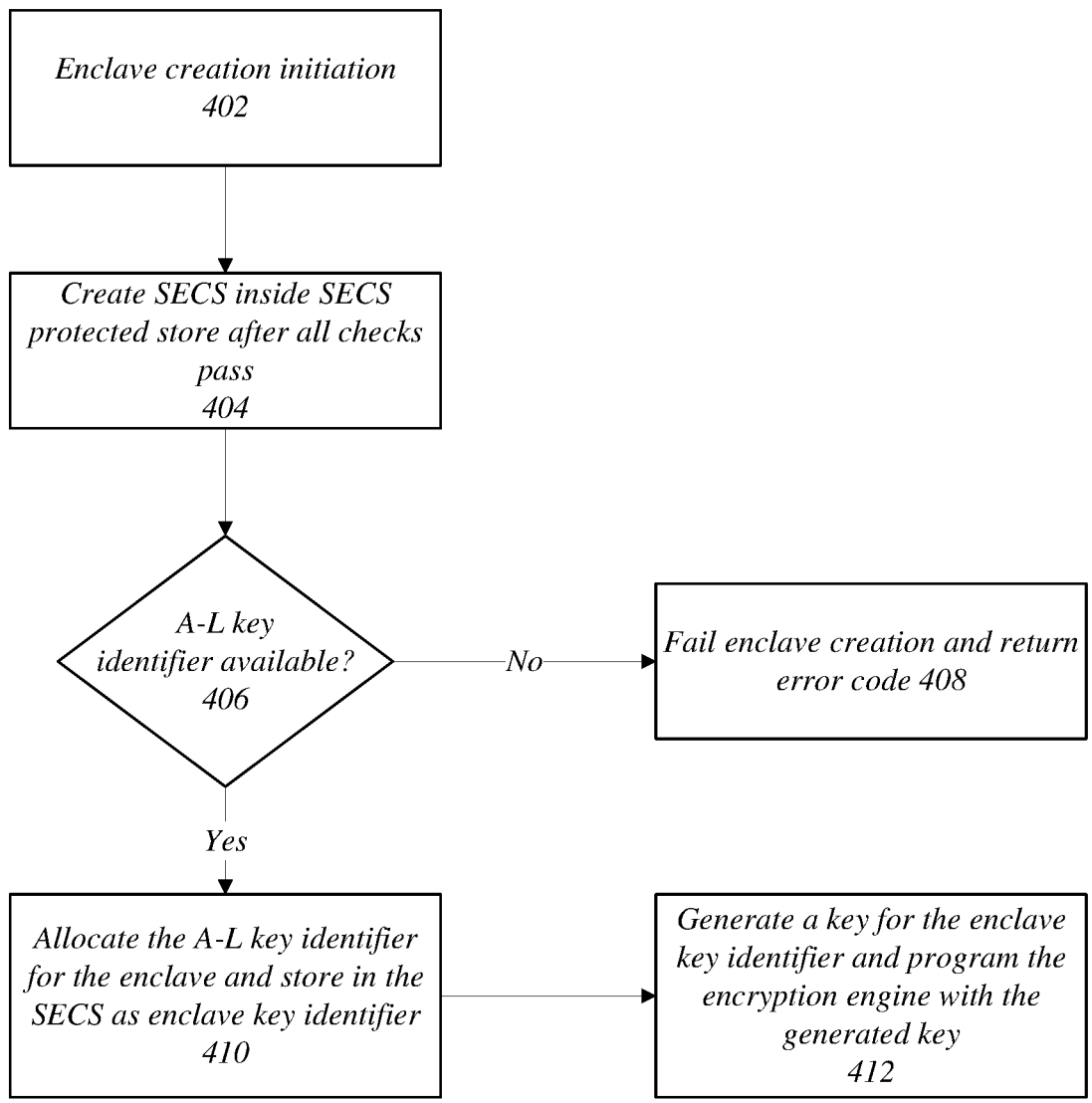
FIG. 4 illustrates an embodiment of a first logic flow.

FIG. 4 illustrates one embodiment of a logic flow 400, which may be representative of operations that may be executed in various embodiments in conjunction with creation of an enclave. The logic flow 400 may be representative of some or all of the operations that may be executed by one or more components of operating environments 100, 200, 300 of FIGS. 1-3, such as processing circuitry 106. In many embodiments, the logic flow 400 may be initiated or realized via one or more ISA instructions. The embodiments are not limited in this context.

In the illustrated embodiment shown in FIG. 4, the logic flow 400 may begin at block 402. At block 402 "enclave creation initiation" creation of an enclave may be initiated. For example, an ECREATE instruction may be used to initiate creation of an enclave. In some embodiments, the ECREATE instruction may be an ISA instruction. In some such embodiments, the ECREATE instruction may be executed by processing circuitry 106. In many embodiments, a number of checks (e.g., of system settings) may be performed as part of initiating or creating an enclave.

Continuing to block 404 "create SECS inside SECS protected store after all check pass" an SECS that corresponds to the enclave being created may be created and stored in the SECS protected store after all check pass. For example, SECS 230-n may be created within SECS protected store 222 after all checks pass. In various embodiments, the SECS may be unique to each enclave and contain metadata that is used by hardware to protect the enclave.

Proceeding to block 406 "A-L key identifier available?" it may be determined whether an A-L key identifier is available to create an enclave. For instance, if all the combinations of available A-L key identifier bits allocated in the physical address 340 have already been assigned to previously created enclaves, then an A-L key identifier may not be available to create an enclave. In such instances, the logic flow 400 may then fail enclave creation and return an error code at block 408.

However, if an A-L key identifier is available to create an enclave, the logic flow 400 may proceed to block 410. At block 410 "allocate the A-L key identifier for the enclave and store in the SECS as the enclave key identifier" the available A-L key identifier may be allocated to the enclave and stored in the corresponding SECS created in block 404. For instance, the allocated A-L key identifier may be stored in SECS 330 as enclave key identifier 334 in key data 332.

Proceeding to block 412 "generate a key for the enclave key identifier and program the encryption engine with the generated key" a key may be generated for the enclave key identifier and the encryption engine may be programmed with the generated key. For example, encryption engine 112 may be programmed to use the generated key for encryption/decryption when the associated enclave key identifier is provided. In some embodiments, the key may be generated by microcode. In some such embodiments, this may include or be done by sampling a random number generator, such as Intel® Digital Random Number Generator.

Figure 5:
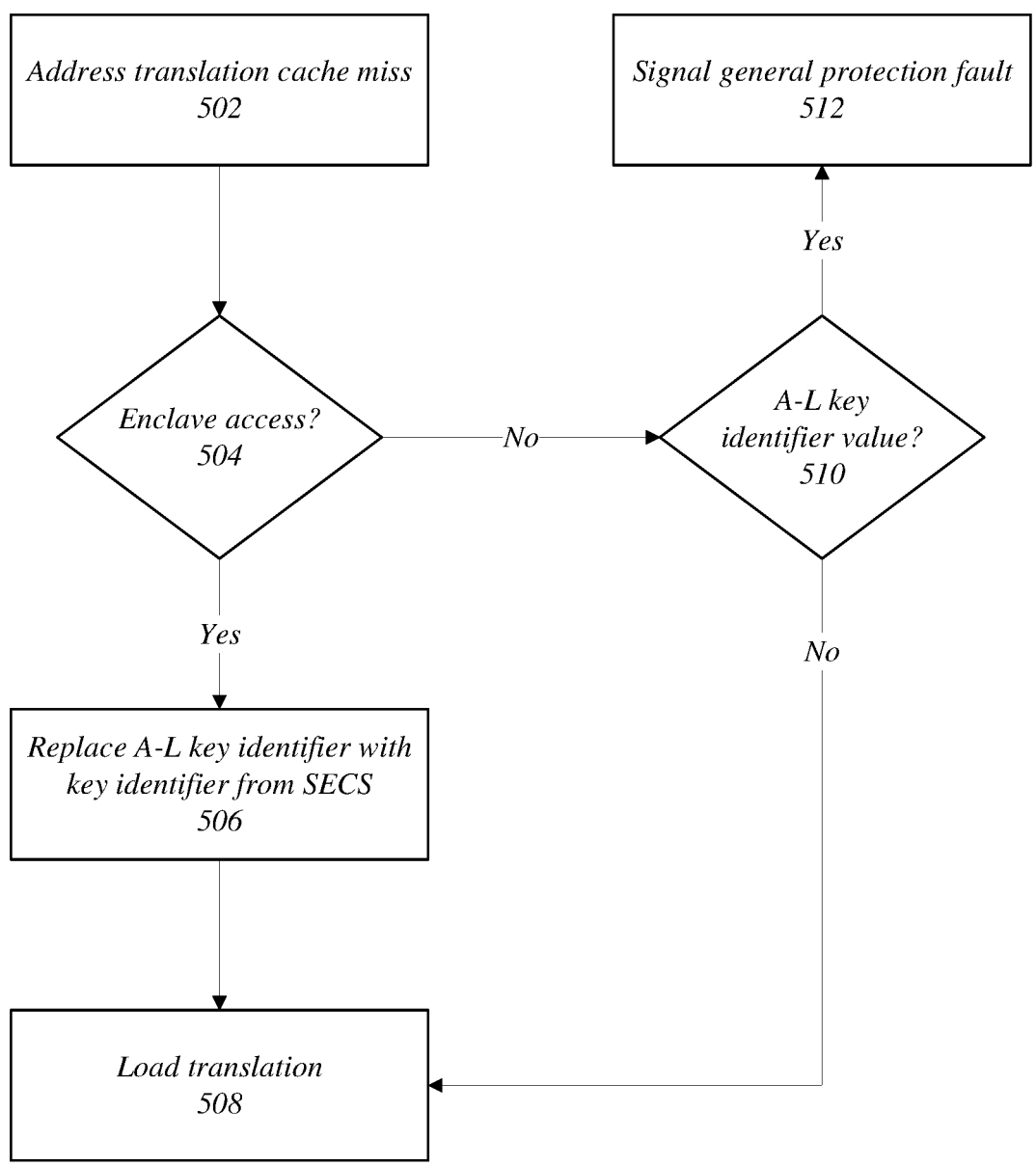
FIG. 5 illustrates an embodiment of a second logic flow.

FIG. 5 illustrates one embodiment of a logic flow 500, which may be representative of operations that may be executed in various embodiments in conjunction with an address translation cache miss. The logic flow 500 may be representative of some or all of the operations that may be executed by one or more components of operating environments 100, 200, 300 of FIGS. 1-3, such as PMH 110. In many embodiments, the logic flow 500 may occur within the TEE 102. In many embodiments, logic flow 500 may be implemented, at least in part, with a hardware mechanism that forces the use of the key identifier assigned to an enclave for any enclave access made by the enclave. In many such embodiments, this may include extensions or features of PMH 110. The embodiments are not limited in this context.

In the illustrated embodiment shown in FIG. 5, the logic flow 500 may begin at block 502. At block 502 "address translation cache miss" an address translation cache miss may occur. For example, a physical address associated with data targeted by a memory access may not be able to be located in the address translation cache 220. In some embodiments, the address translation cache miss may comprise a TLB miss. Continuing to block 504 "enclave access?" it may be determined whether the data targeted by the memory access includes enclave data. If it is an enclave access, the A-L key identifier may be replaced with the key identifier from the SECS associated with the enclave at block 506. For instance, PMH 110 may replace key identifier 344 with enclave key identifier 334. Next, the translation may be loaded at block 508. In various embodiments, this may ensure, at least in part, that software cannot manipulate the key identifiers that are used for enclaves, thereby ensuring full confidentiality of enclave data.

However, if the memory access is not an enclave access at block 504, the logic flow 500 may proceed to block 510. At block 510 "A-L key identifier value?" it may be determined whether the physical address corresponding to the memory access (as provided by software) includes an A-L key identifier. If the physical address corresponding to the memory access includes an A-L key identifier, then a general protection fault may be signaled at block 512 to prevent software from having control over A-L key identifiers. In several embodiments, this may ensure, at least in part, that software cannot manipulate the key identifiers that are used for enclaves, thereby ensuring full confidentiality of enclave data. However, if the physical address corresponding to the memory access does not include an A-L key identifier, then the translation may be loaded at block 508. For instance, the translation from page tables 224 (as specified by software) may be loaded to the address translation cache 220.

FIG. 6 illustrates one embodiment of a logic flow 600, which may be representative of operations that may be executed in various embodiments in conjunctions with enclave confidentiality management. The logic flow 600 may be representative of some or all of the operations that may be executed by one or more components of operating environments 100, 200, 300 of FIGS. 1-3, such as computing platform 101. The embodiments are not limited in this context.

In the illustrated embodiment shown in FIG. 6, the logic flow 600 may begin at block 602. At block 602 "determine whether a memory access request targets data associated with an enclave, the memory access request associated with a set of physical address bits comprising a set of key identifier bits and a set of memory address bits" it may be determined whether a memory access request associated with a set of physical address bits comprising a set of key identifier bits and a set of memory address bits targets data associated with an enclave. For instance, PMH 110 may determine whether a memory access request associated with physical address 340 targets enclave data.

Continuing to block 604 "identify an enclave key identifier based on the enclave associated with the access request when the memory access request targets data associated with the enclave" when the memory access request targets data associated with an enclave, an enclave key identifier may be identified based on the enclave associated with the access request. For example, PHM 110 may identifier enclave key identifier 334 in SECS 330 based on an association of SECS 330 with the enclave associated with the access request. At block 606 "replace the set of key identifier bits with the enclave key identifier to produce a revised set of physical address bits when the memory access request targets data associated with the enclave" the set of key identifier bits may be replaced with the enclave key identifier to produce a revised set of physical address bits when the memory access request targets data associated with the enclave. For example, key identifier 344 may be replaced with enclave key identifier 334 to produce a revised set of physical address bits when the memory access request targets enclave data associated with SECS 330.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions, such as computer-executable instructions to implement one or more of logic flows or operations described herein, such as with respect to logic flows 400, 500, and 600 of FIGS. 4-6. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
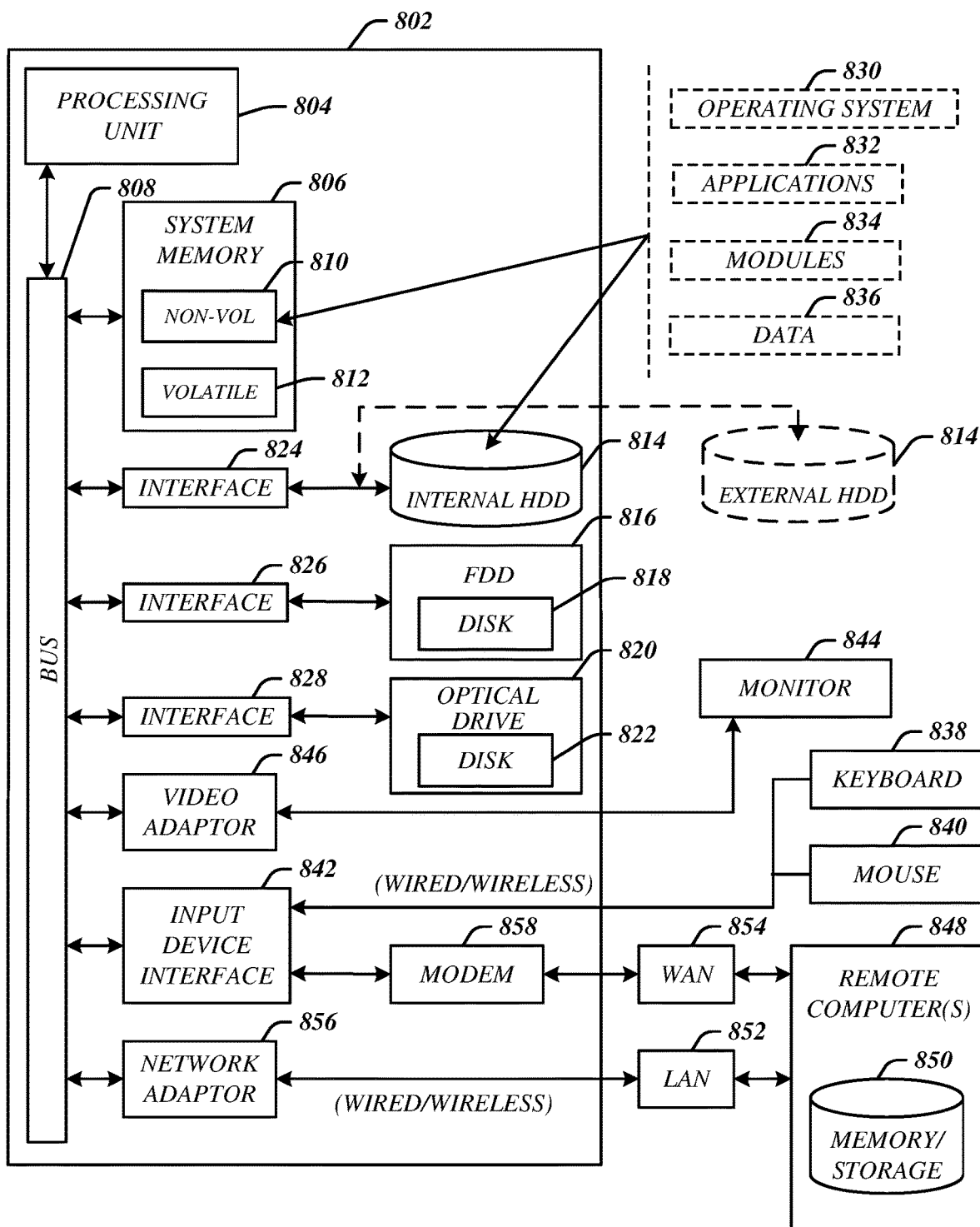
FIG. 8 illustrates an embodiment of a computing architecture.

FIG. 8 illustrates an embodiment of an exemplary computing architecture 800 that may be suitable for implementing various embodiments as previously described. In various embodiments, the computing architecture 800 may comprise or be implemented as part of an electronic device. In some embodiments, the computing architecture 800 may be representative, for example, of a computer system that implements one or more components of operating environments 100, 200, 300 of FIGS. 1-3. In some embodiments, computing architecture 800 may be representative, for example, one or more portions of computing platform 101 that implement one or more embodiments described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 994 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the TEE 102, such as one or more portions of PMH 110, encryption engine 112, or an enclave.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 994 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. In various embodiments, one or more migrations may occur via the networked environment. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856.

The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 1358, or is connected to a communications server on the WAN 1354, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
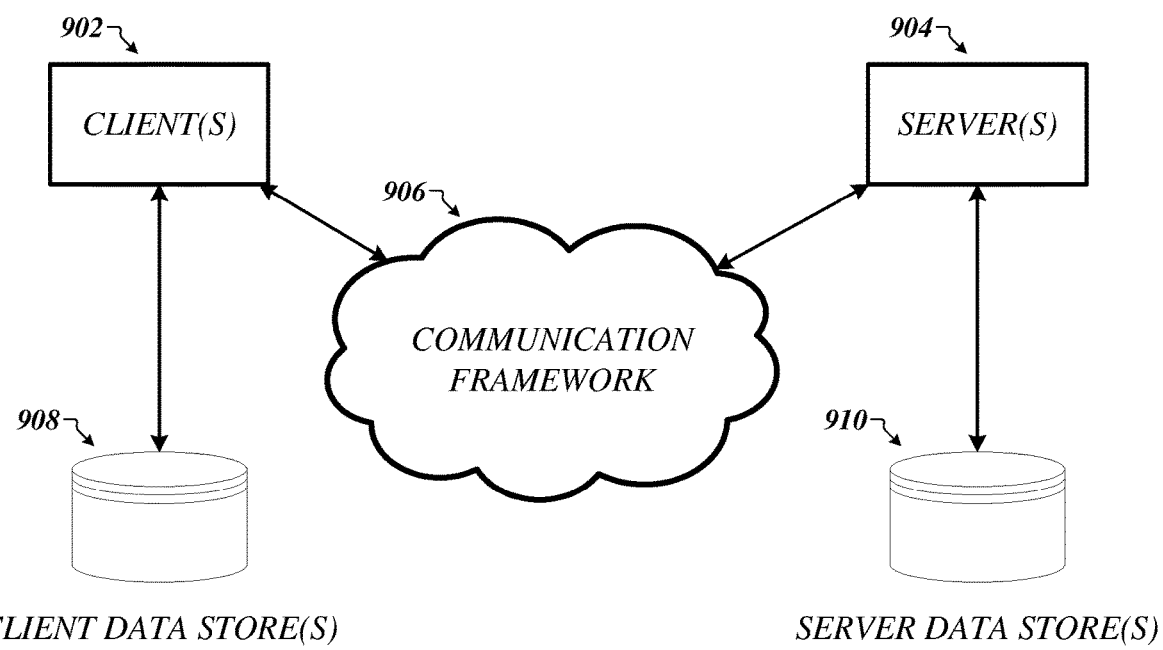
FIG. 9 illustrates an embodiment of a communications architecture.

FIG. 9 illustrates a block diagram of an exemplary communications architecture 900 suitable for implementing various embodiments as previously described, such as virtual machine migration. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 and the servers 904 are operatively connected to one or more respective client data stores 908 and server data stores 910 that can be employed to store information local to the respective clients 902 and servers 904, such as cookies and/or associated contextual information. In various embodiments, any one of servers 904 may implement one or more of logic flows or operations described herein, and storage medium 700 of FIG. 7 in conjunction with storage of data received from any one of clients 902 on any of server data stores 910.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments, from which numerous permutations and configurations will be apparent.

Example 1 is an apparatus for enclave management, comprising: logic, at least a portion of the logic implemented in circuitry, the logic to: determine whether a memory access request targets data associated with an enclave, the memory access request associated with a set of physical address bits comprising a set of key identifier bits and a set of memory address bits; identify an enclave key identifier based on the enclave associated with the memory access request when the memory access request targets data associated with the enclave; and replace the set of key identifier bits with the enclave key identifier to produce a revised set of physical address bits when the memory access request targets data associated with the enclave.

Example 2 includes the subject matter of Example 1, the logic to identify the enclave key identifier based on a secure enclave control structure (SECS) associated with the enclave.

Example 3 includes the subject matter of Example 2, the SECS located in an SECS protected store in an internal memory.

Example 4 includes the subject matter of Example 3, the SECS protected store located within a trusted execution environment (TEE) and the data targeted by the memory access request in a memory located external to the TEE.

Example 5 includes the subject matter of Example 1, the logic to identify the set of physical address bits based on a set of virtual address bits and a page table.

Example 6 includes the subject matter of Example 1, the logic to store the revised set of physical address bits in an address translation cache when the memory access request targets data associated with the enclave.

Example 7 includes the subject matter of Example 1, the enclave key identifier comprising an indication of a key used to encrypt/decrypt the data associated with the enclave.

Example 8 includes the subject matter of Example 1, the logic to determine whether a memory access request targets data associated with the enclave in response to a cache miss in an address translation cache.

Example 9 includes the subject matter of Example 8, the address translation cache comprising a translation lookaside buffer.

Example 10 includes the subject matter of Example 1, the set of memory address bits to correspond with a location of the data in a protected memory.

Example 11 includes the subject matter of Example 1, the logic to determine whether the set of key identifier bits comprise a value reserved for enclave key identifiers when the memory access request fails to target data associated with the enclave.

Example 12 includes the subject matter of Example 11, the logic to store the set of physical address bits in an address translation cache when the memory access request fails to target data associated with the enclave and the set of key identifier bits fail to comprise a value reserved for enclave key identifiers.

Example 13 includes the subject matter of Example 11, the logic to signal a general protection fault when the memory access request fails to target data associated with the enclave and the set of key identifier bits comprise a value reserved for enclave key identifiers.

Example 14 is a method, comprising: determining whether a memory access request targets data associated with an enclave, the memory access request associated with a set of physical address bits comprising a set of key identifier bits and a set of memory address bits; identifying an enclave key identifier based on the enclave associated with the memory access request when the memory access request targets data associated with the enclave; and replacing the set of key identifier bits with the enclave key identifier to produce a revised set of physical address bits when the memory access request targets data associated with the enclave.

Example 15 includes the subject matter of Example 14, comprising identifying the enclave key identifier based on a secure enclave control structure (SECS) associated with the enclave.

Example 16 includes the subject matter of Example 15, the SECS located in an SECS protected store in an internal memory.

Example 17 includes the subject matter of Example 16, the SECS protected store located within a trusted execution environment (TEE) and the data targeted by the memory access request in a memory located external to the TEE.

Example 18 includes the subject matter of Example 14, comprising identifying the set of physical address bits based on a set of virtual address bits and a page table.

Example 19 includes the subject matter of Example 14, comprising storing the revised set of physical address bits in an address translation cache when the memory access request targets data associated with the enclave.

Example 20 includes the subject matter of Example 14, the enclave key identifier comprising an indication of a key used to encrypt/decrypt the data associated with the enclave.

Example 21 includes the subject matter of Example 14, comprising determining whether a memory access request targets data associated with the enclave in response to a cache miss in an address translation cache.

Example 22 includes the subject matter of Example 21, the address translation cache comprising a translation lookaside buffer.

Example 23 includes the subject matter of Example 14, the set of memory address bits to correspond with a location of the data in a protected memory.

Example 24 includes the subject matter of Example 14, comprising determining whether the set of key identifier bits comprise a value reserved for enclave key identifiers when the memory access request fails to target data associated with the enclave.

Example 25 includes the subject matter of Example 24, comprising storing the set of physical address bits in an address translation cache when the memory access request fails to target data associated with the enclave and the set of key identifier bits fail to comprise a value reserved for enclave key identifiers.

Example 26 includes the subject matter of Example 24, comprising signaling a general protection fault when the memory access request fails to target data associated with the enclave and the set of key identifier bits comprise a value reserved for enclave key identifiers.

Example 27 is at least one non-transitory computer-readable medium comprising a set of instructions that, in response to being executed by a processor circuit, cause the processor circuit to: determine whether a memory access request targets data associated with an enclave, the memory access request associated with a set of physical address bits comprising a set of key identifier bits and a set of memory address bits; identify an enclave key identifier based on the enclave associated with the memory access request when the memory access request targets data associated with the enclave; and replace the set of key identifier bits with the enclave key identifier to produce a revised set of physical address bits when the memory access request targets data associated with the enclave.

Example 28 includes the subject matter of Example 27, comprising instructions that, in response to being executed by the processor circuit, cause the processor circuit to identify the enclave key identifier based on a secure enclave control structure (SECS) associated with the enclave.

Example 29 includes the subject matter of Example 28, the SECS located in an SECS protected store in an internal memory.

Example 30 includes the subject matter of Example 29, the SECS protected store located within a trusted execution environment (TEE) and the data targeted by the memory access request in a memory located external to the TEE.

Example 31 includes the subject matter of Example 27, comprising instructions that, in response to being executed by the processor circuit, cause the processor circuit to identify the set of physical address bits based on a set of virtual address bits and a page table.

Example 32 includes the subject matter of Example 27, comprising instructions that, in response to being executed by the processor circuit, cause the processor circuit to store the revised set of physical address bits in an address translation cache when the memory access request targets data associated with the enclave.

Example 33 includes the subject matter of Example 27, the enclave key identifier comprising an indication of a key used to encrypt/decrypt the data associated with the enclave.

Example 34 includes the subject matter of Example 27, comprising instructions that, in response to being executed by the processor circuit, cause the processor circuit to determine whether a memory access request targets data associated with the enclave in response to a cache miss in an address translation cache.

Example 35 includes the subject matter of Example 34, the address translation cache comprising a translation lookaside buffer.

Example 36 includes the subject matter of Example 27, the set of memory address bits to correspond with a location of the data in a protected memory.

Example 37 includes the subject matter of Example 27, comprising instructions that, in response to being executed by the processor circuit, cause the processor circuit to determine whether the set of key identifier bits comprise a value reserved for enclave key identifiers when the memory access request fails to target data associated with the enclave.

Example 38 includes the subject matter of Example 37, comprising instructions that, in response to being executed by the processor circuit, cause the processor circuit to store the set of physical address bits in an address translation cache when the memory access request fails to target data associated with the enclave and the set of key identifier bits fail to comprise a value reserved for enclave key identifiers.

Example 39 includes the subject matter of Example 37, comprising instructions that, in response to being executed by the processor circuit, cause the processor circuit to signal a general protection fault when the memory access request fails to target data associated with the enclave and the set of key identifier bits comprise a value reserved for enclave key identifiers.

Example 40 is an apparatus, comprising: means for determining whether a memory access request targets data associated with an enclave, the memory access request associated with a set of physical address bits comprising a set of key identifier bits and a set of memory address bits; means for identifying an enclave key identifier based on the enclave associated with the memory access request when the memory access request targets data associated with the enclave; and means for replacing the set of key identifier bits with the enclave key identifier to produce a revised set of physical address bits when the memory access request targets data associated with the enclave.

Example 41 includes the subject matter of Example 40, comprising means for identifying the enclave key identifier based on a secure enclave control structure (SECS) associated with the enclave.

Example 42 includes the subject matter of Example 41, the SECS located in an SECS protected store in an internal memory.

Example 43 includes the subject matter of Example 42, the SECS protected store located within a trusted execution environment (TEE) and the data targeted by the memory access request in a memory located external to the TEE.

Example 44 includes the subject matter of Example 40, comprising means for identifying the set of physical address bits based on a set of virtual address bits and a page table.

Example 45 includes the subject matter of Example 40, comprising means for storing the revised set of physical address bits in an address translation cache when the memory access request targets data associated with the enclave.

Example 46 includes the subject matter of Example 40, the enclave key identifier comprising an indication of a key used to encrypt/decrypt the data associated with the enclave.

Example 47 includes the subject matter of Example 40, comprising means for determining whether a memory access request targets data associated with the enclave in response to a cache miss in an address translation cache.

Example 48 includes the subject matter of Example 47, the address translation cache comprising a translation lookaside buffer.

Example 49 includes the subject matter of Example 40, the set of memory address bits to correspond with a location of the data in a protected memory.

Example 50 includes the subject matter of Example 40, comprising means for determining whether the set of key identifier bits comprise a value reserved for enclave key identifiers when the memory access request fails to target data associated with the enclave.

Example 51 includes the subject matter of Example 50, comprising means for storing the set of physical address bits in an address translation cache when the memory access request fails to target data associated with the enclave and the set of key identifier bits fail to comprise a value reserved for enclave key identifiers.

Example 52 includes the subject matter of Example 50, comprising means for signaling a general protection fault when the memory access request fails to target data associated with the enclave and the set of key identifier bits comprise a value reserved for enclave key identifiers.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. An apparatus, comprising:
   logic, at least a portion of the logic implemented in circuitry, the logic to:
   determine whether a memory access request targets data associated with an enclave, the memory access request associated with a set of physical address bits comprising a set of key identifier bits and a set of memory address bits;
   identify an enclave key identifier based on the enclave associated with the memory access request when the memory access request targets data associated with the enclave; and
   replace the set of key identifier bits with the enclave key identifier to produce a revised set of physical address bits when the memory access request targets data associated with the enclave.

2. The apparatus of claim 1, the logic to identify the enclave key identifier based on a secure enclave control structure (SECS) associated with the enclave.

3. The apparatus of claim 2, the SECS located in a SECS protected store located in an internal memory.

4. The apparatus of claim 3, the SECS protected store located within a trusted execution environment (TEE) and the data targeted by the memory access request in a memory located external to the TEE.

5. The apparatus of claim 1, the logic to identify the set of physical address bits based on a set of virtual address bits and a page table.

6. The apparatus of claim 1, the logic to store the revised set of physical address bits in an address translation cache when the memory access request targets data associated with the enclave.

7. The apparatus of claim 1, the enclave key identifier comprising an indication of a key used to encrypt/decrypt the data associated with the enclave.

8. The apparatus of claim 1, the logic to determine whether a memory access request targets data associated with the enclave in response to a cache miss in an address translation cache.

9. The apparatus of claim 8, the address translation cache comprising a translation lookaside buffer.

10. The apparatus of claim 1, the set of memory address bits to correspond with a location of the data in a protected memory.

11. The apparatus of claim 1, the logic to determine whether the set of key identifier bits comprise a value reserved for enclave key identifiers when the memory access request fails to target data associated with the enclave.

12. The apparatus of claim 11, the logic to store the set of physical address bits in an address translation cache when the memory access request fails to target data associated with the enclave and the set of key identifier bits fail to comprise a value reserved for enclave key identifiers.

13. The apparatus of claim 11, the logic to signal a general protection fault when the memory access request fails to target data associated with the enclave and the set of key identifier bits comprise a value reserved for enclave key identifiers.

14. A method, comprising:
   determining whether a memory access request targets data associated with an enclave, the memory access request associated with a set of physical address bits comprising a set of key identifier bits and a set of memory address bits;
   identifying an enclave key identifier based on the enclave associated with the memory access request when the memory access request targets data associated with the enclave; and
   replacing the set of key identifier bits with the enclave key identifier to produce a revised set of physical address bits when the memory access request targets data associated with the enclave.

15. The method of claim 14, comprising identifying the enclave key identifier based on a secure enclave control structure (SECS) associated with the enclave.

16. The method of claim 15, the SECS located in an SECS protected store located in an internal memory.

17. The method of claim 16, the SECS protected store located within a trusted execution environment (TEE) and the data targeted by the memory access request in a memory located external to the TEE.

18. The method of claim 14, comprising identifying the set of physical address bits based on a set of virtual address bits and a page table.

19. The method of claim 14, comprising storing the revised set of physical address bits in an address translation cache when the memory access request targets data associated with the enclave.

20. The method of claim 14, the enclave key identifier comprising an indication of a key used to encrypt/decrypt the data associated with the enclave.

21. At least one non-transitory computer-readable medium comprising a set of instructions that, in response to being executed by a processor circuit, cause the processor circuit to:
   determine whether a memory access request targets data associated with an enclave, the memory access request associated with a set of physical address bits comprising a set of key identifier bits and a set of memory address bits;
   identify an enclave key identifier based on the enclave associated with the memory access request when the memory access request targets data associated with the enclave; and
   replace the set of key identifier bits with the enclave key identifier to produce a revised set of physical address bits when the memory access request targets data associated with the enclave.

22. The at least one non-transitory computer-readable medium of claim 21, comprising instructions that, in response to being executed by the processor circuit, cause the processor circuit to identify the enclave key identifier based on a secure enclave control structure (SECS) associated with the enclave.

23. The at least one non-transitory computer-readable medium of claim 22, the SECS located in an SECS protected store in an internal memory.

24. The at least one non-transitory computer-readable medium of claim 23, the SECS protected store located within a trusted execution environment (TEE) and the data targeted by the memory access request in a memory located external to the TEE.

25. The at least one non-transitory computer-readable medium of claim 21, comprising instructions that, in response to being executed by the processor circuit, cause the processor circuit to identify the set of physical address bits based on a set of virtual address bits and a page table.

* * * * *